United States Patent
Morita et al.

(10) Patent No.: US 12,253,119 B2
(45) Date of Patent: Mar. 18, 2025

(54) CAM CLUTCH UNIT

(71) Applicant: TSUBAKIMOTO CHAIN CO., Osaka (JP)

(72) Inventors: Akira Morita, Osaka (JP); Tadashi Murakami, Osaka (JP); Hirokazu Tsuneda, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/388,717

(22) Filed: Nov. 10, 2023

(65) Prior Publication Data

US 2024/0200619 A1 Jun. 20, 2024

(30) Foreign Application Priority Data

Dec. 16, 2022 (JP) ................................. 2022-201314

(51) Int. Cl.
*F16D 41/07* (2006.01)
*F16D 41/06* (2006.01)

(52) U.S. Cl.
CPC ...... *F16D 41/07* (2013.01); *F16D 2041/0603* (2013.01); *F16D 2041/0605* (2013.01)

(58) Field of Classification Search
CPC ......... F16D 41/064–066; F16D 41/067; F16D 41/069–073; F16D 41/08; F16D 41/084; F16D 41/086–105; F16D 2041/0603; F16D 2041/0605
See application file for complete search history.

(56) References Cited

U.S. PATENT DOCUMENTS

| | | | | |
|---|---|---|---|---|
| 3,022,875 | A * | 2/1962 | Davis | F16D 41/07 192/45.1 |
| 5,722,521 | A * | 3/1998 | Awaji | F16D 41/066 192/45.007 |
| 6,640,949 | B1 * | 11/2003 | Vranish | F16D 41/07 192/41 A |
| 11,808,312 | B2 * | 11/2023 | Heubach | F16D 41/067 |
| 2005/0067248 | A1 | 3/2005 | Takasu | |
| 2015/0144450 | A1 * | 5/2015 | Chambonneau | F16D 41/06 29/428 |

FOREIGN PATENT DOCUMENTS

JP 2005-106135 A 4/2005
JP 2023-104553 A 7/2023

* cited by examiner

*Primary Examiner* — James J Taylor, II
(74) *Attorney, Agent, or Firm* — WHDA, LLP (57) ABSTRACT

A cam clutch unit which can receive an axial load in a small space without increasing rigidity of a cage ring or disposing another member is provided.
The cam clutch unit includes a plurality of cams 130 and a plurality of rollers 140 disposed so as to be aligned in a circumferential direction between an inner ring and an outer ring, a cage ring 150 having a plurality of pocket portions 151, 152 which regulate relative movement in a circumferential direction of the cam 130 and the roller 140, and an annular spring 160 which urges the cam 130, in which the roller 140 has a part protruding in an axial direction more than the cage ring 150 when being held by the cage ring 150.

5 Claims, 11 Drawing Sheets

RELATED ART

FIG.11

RELATED ART

FIG12

RELATED ART

FIG.13

RELATED ARD

FIG.14

RELATED ART

FIG.15

RELATED ART

FIG.16

RELATED ART

FIG.17

RELATED ART

FIG.18

RELATED ART

FIG.19

RELATED ART

CAM CLUTCH UNIT

BACKGROUND OF THE INVENTION

1. Field of the Invention

The present invention relates to a cam clutch unit which transmits and shuts off a torque between an input shaft and an output shaft.

2. Description of the Related Art

A cam clutch unit including a plurality of cams and a plurality of rollers disposed between an inner ring and an outer ring coaxially provided capable of relative rotation, a cage ring having a plurality of pocket portions which regulate relative movement in a circumferential direction of the cam and the roller, and an annular spring which urges the cam is publicly known as a cam clutch unit.

Regarding a cam clutch unit 500 including a cam and a roller, as shown in FIGS. 10 to 14, for example, a cam 530 and a roller 540 are accommodated in pocket portions 551, 552 of a cage ring 550 so that a plurality of the cams 530 and a plurality of the rollers 540 are disposed in a circumferential direction between an inner ring and an outer ring coaxially provided capable of relative rotation, and relative movement in the circumferential direction of the cam 530 and the roller 540 is regulated.

Moreover, the cam 530 and the roller 540 have groove portions 535, 545 in the circumferential direction, respectively, and are configured such that annular springs 560 are accommodated in the groove portions 535, 545 and urge the cam 530 and the roller 540 toward the inner ring side.

Figure 12:
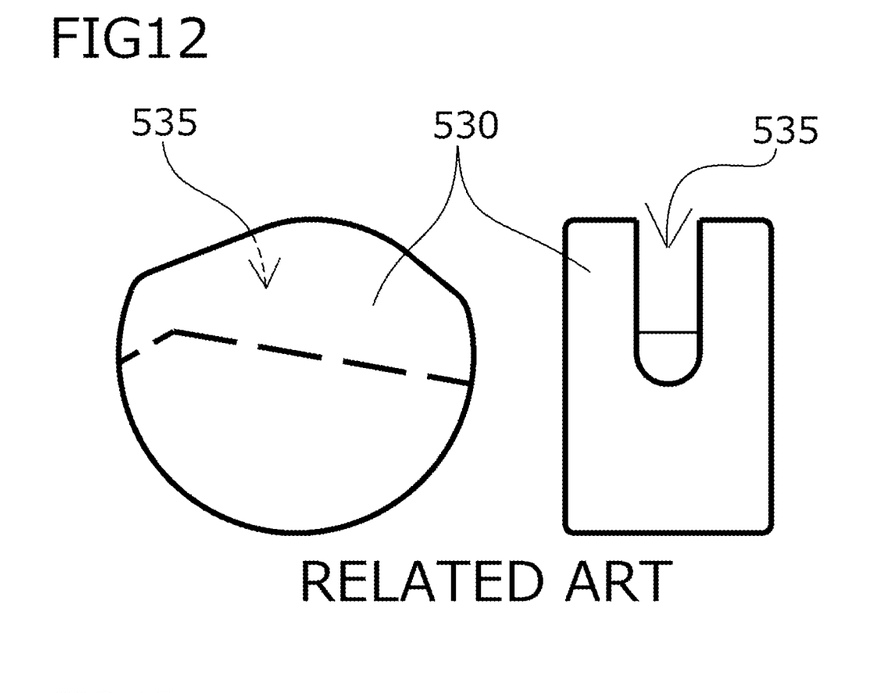
FIG. 12 is a side view and a front view of a cam of the cam clutch unit shown in FIG. 10.
Figure 13:
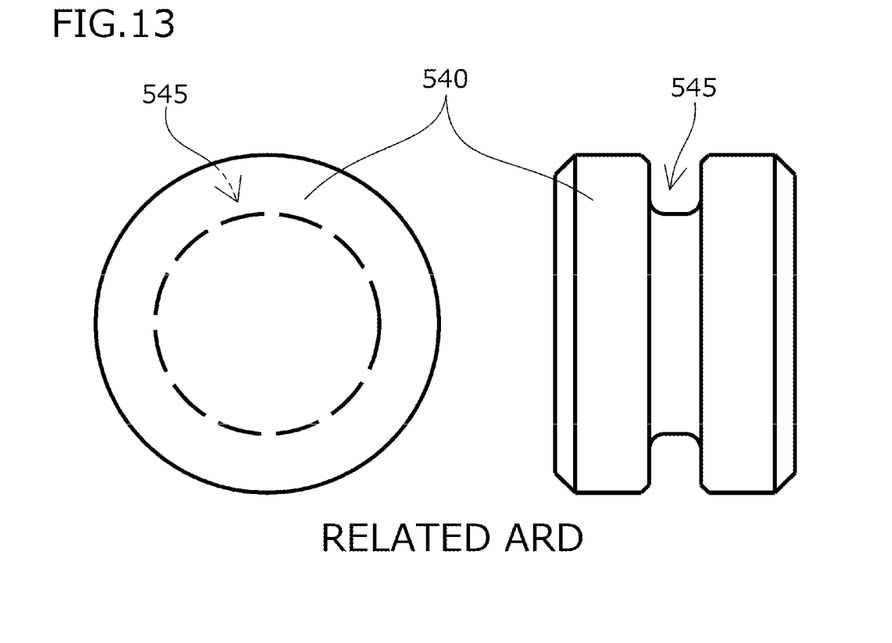
FIG. 13 is a side view and a front view of a roller of the cam clutch unit shown in FIG. 10.
Figure 14:
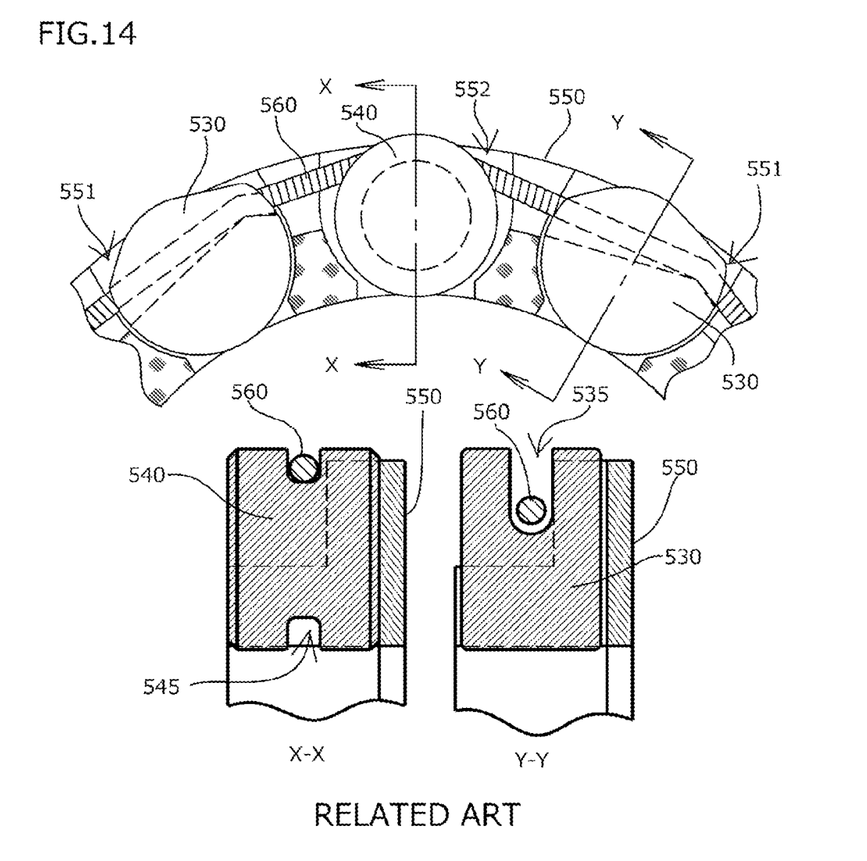
FIG. 14 is a partial side view and a sectional view of the cam clutch unit shown in FIG. 10.

In the publicly-known cam clutch unit, since at the centers of the cam 530 and the roller 540 requiring a material which is resistant against abrasion or impact have the groove portions 535, 545 in the circumferential direction in which the annular springs 560 are accommodated, there were such problems that the number of machining processes at manufacture of the cam 530 and the roller 540 is large, a degree of difficulty is high, and a width dimension is limited in machining, whereby the width cannot be made smaller.

Moreover, the roller 540 needs to be freely rotated by being restricted only in an axial direction, but since frictional sliding is generated between a bottom part of the groove portion 545 and a spring 560, there was a problem that unignorable rotational resistance is generated at the time of high-speed rotation, and there was a concern that deterioration of the spring 560 due to abrasion would affect a life of the cam clutch itself.

For example, as shown in the Japanese Patent Application Publication No. 2005-106135, the one with an urging portion by a spring provided on both end sides in the axial direction of the cam and the roller is also publicly known, but the cam needs a locking structure in order to prevent removal in the axial direction of the spring, and though the degree of difficulty in the machining of the cam and the roller is somewhat alleviated, the number of machining processes cannot be reduced.

In order to solve the aforementioned problems, as shown in FIGS. 15 to 19, the applicant proposed a cam clutch unit 600 including a plurality of cams 630 as engagement elements which transmit and shut off a torque between an inner ring and an outer ring in an annular space between a track surface of the inner ring and a track surface of the outer ring coaxially provided capable of relative rotation, a plurality of rollers 640 which freely rotate the inner ring and the outer ring, a cage ring 650 having a plurality of pocket portions 651, 652 which regulate relative movement in the circumferential direction of the cam 630 and the roller 640, and an annular spring 660 which urges each of the plurality of cams 630 in a meshing direction with respect to the inner ring and the outer ring (Japanese Patent Application No. 2022-5605).

Figure 17:
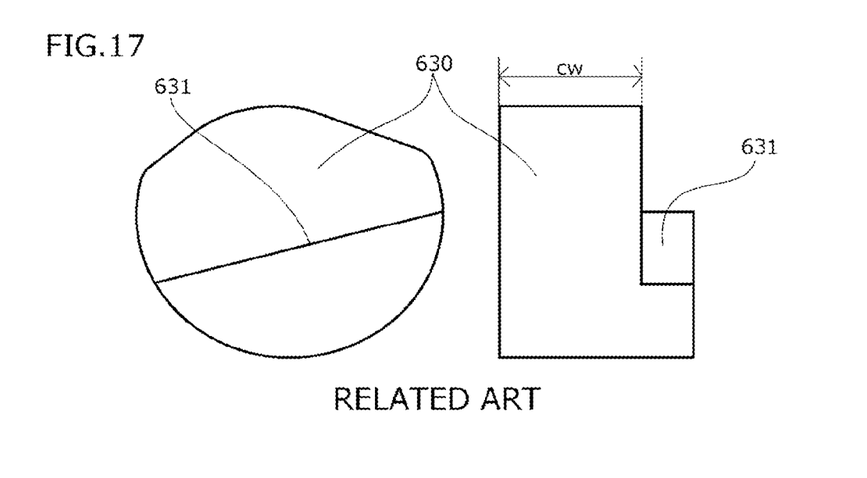
FIG. 17 is a side view and a front view of a cam of the cam clutch unit shown in FIG. 15.

In this cam clutch unit 600, each of the plurality of cams 630 has, as shown in FIG. 17 and the like, an engagement stepped portion 631, which is engageable with the annular spring 660, on one of end surfaces in the axial direction.

The engagement stepped portion 631 has an inclined shape with a right side illustrated in FIG. 17 positioned on an outer periphery side in a state where the cam 630 is free, and by means of pressing by the spring 660 onto the right side of the engagement stepped portion 631, the cam 630 is urged to the inner ring side and is urged to swing in a direction in which the cam 630 is operated.

Figure 18:
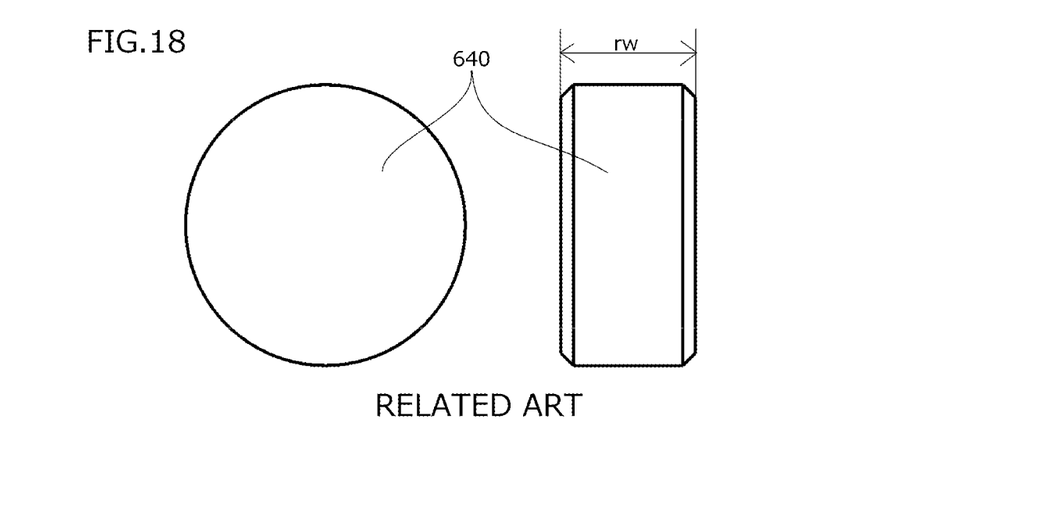
FIG. 18 is a side view and a front view of a roller of the cam clutch unit shown in FIG. 15.

As shown in FIG. 18 and the like, the plurality of rollers 640 do not have a groove or a stepped part, and an axial-direction dimension rw of the roller 640 is equal to or smaller than an axial-direction dimension cw excluding the engagement stepped portion 631 of the cam 630.

Outer-peripheral edge parts of both end surfaces of the roller 640 is chamfered so as to prevent hooking with the spring 660.

Figure 15:
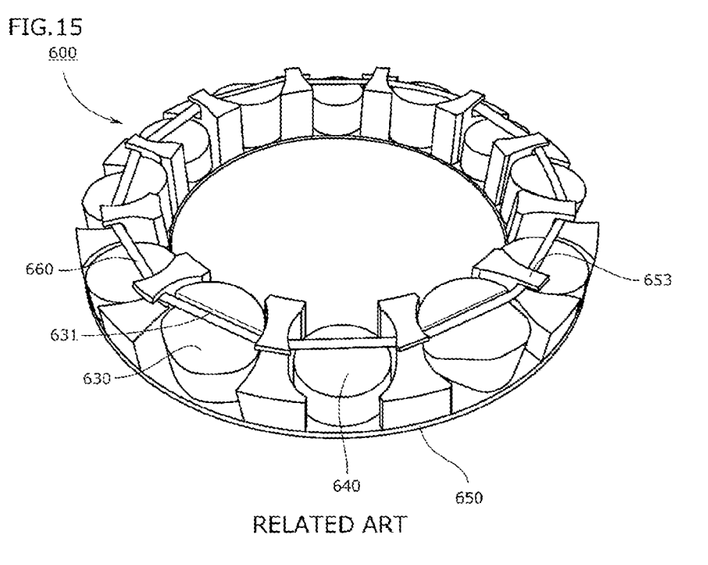
FIG. 15 is a perspective view of a cam clutch unit according to a reference example.
Figure 16:
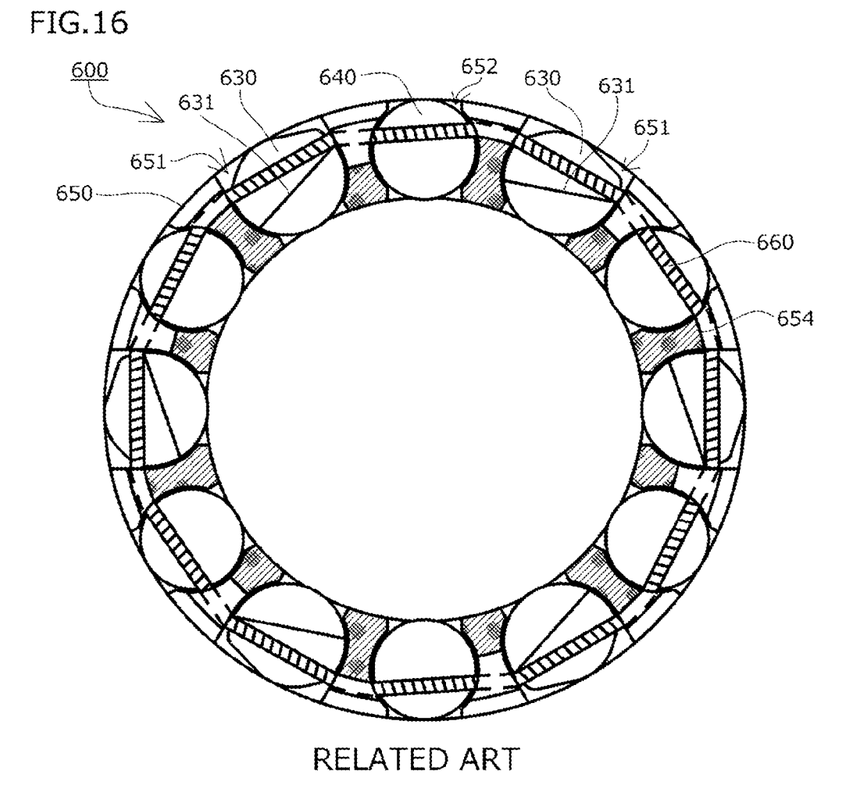
FIG. 16 is a side view of the cam clutch unit shown in FIG. 15 viewed in a rotation axis direction.

The cage ring 650 has the pocket portion 651 which accommodates the cam 630 and regulates relative movement in the circumferential direction as well as the pocket portion 652 which accommodates the roller 640 and regulates the relative movement in the circumferential direction and a plurality of hook portions 653 which regulate movement in the axial direction of the annular spring 660.

The pocket portion 651 which accommodates the cam 630 and the pocket portion 652 which accommodates the roller 640 of the cage ring 650 are disposed alternately in the circumferential direction.

In each of the pocket portions 651, 652, movement in one side of the axial direction of the cam 630 and the roller 640 is regulated on a surface on one end surface side in the axial direction, and the movement in the other side in the axial direction is regulated by the spring 660.

Figure 19:
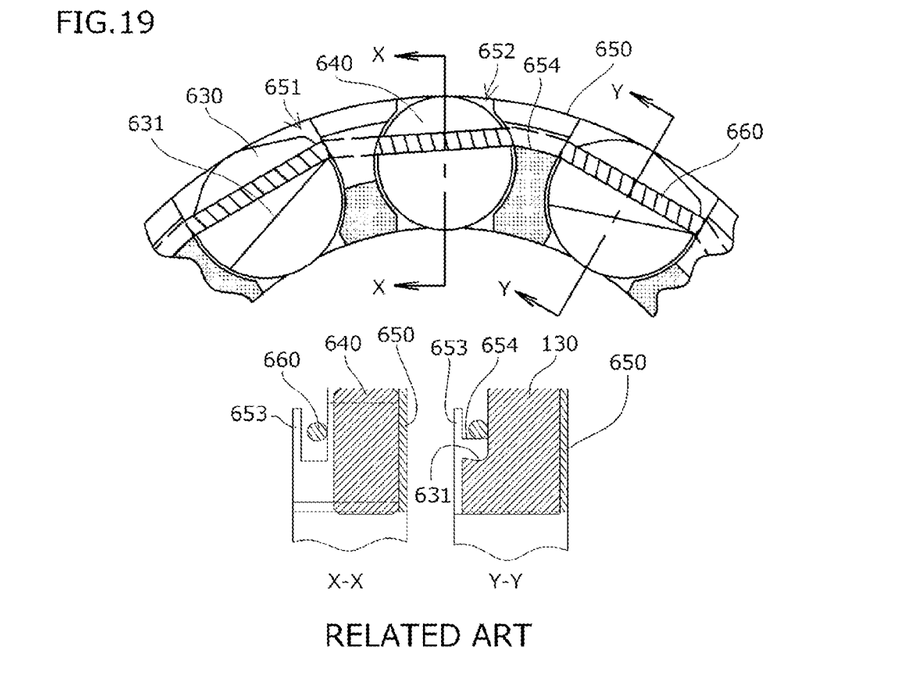
FIG. 19 is a partial side view and a sectional view of the cam clutch unit shown in FIG. 15.

Moreover, a surface adjacent to the roller 640 of the pocket portion 652 which accommodates the roller 640 is formed having a shape which regulates the movement of the roller 640 to the outer ring side and the inner ring side. Furthermore, as shown in FIG. 19, the hook portion 653 adjacent to a left side in the illustration of the pocket portion 651 which accommodates the cam 630 has a hook bottom portion 654 which regulates movement in a radial direction of the annular spring 660.

SUMMARY OF THE INVENTION

The aforementioned cam clutch unit proposed by the applicant has such superior effects that a simple structure, fewer machining processes at manufacture, a lower degree of difficulty, whereby the width can be made thinner, and the engagement stepped portion on the end surface of the cam does not have to be machined to such a shape that regulates movement in the axial direction of the spring, and moreover, the number of machining processes is decreased, and the degree of difficulty is lowered.

Moreover, there were such superior effects that a radius of the spring on the both ends of each cam is specified by the hook bottom portion, whereby an influence on a pressing force of each cam by a change in an attitude of the other cams is suppressed and thus, the adjacent cams can be uniformly pressurized, and a cam clutch with high accuracy can be provided and moreover, the roller can freely rotate by being restricted only in the axial direction, and frictional sliding is rarely generated between it and the spring, whereby the rotational resistance can be reduced.

However, when an axial load generated on the inner ring or the outer ring is to be received by the cam clutch unit, the publicly-known cam clutch unit or the aforementioned cam clutch unit proposed by the applicant has such a structure that, when a cam and a roller are inserted into pocket portions of a cage ring, a cage ring is present on an outer side of an end part in an axial direction of the cam or the roller and thus, the axial load needs to be received by the cage ring, but due to a cage structure, it was difficult to ensure rigidity to withstand the load.

Moreover, additional disposition of a member which receives the axial load can be considered, but a large space is needed for that.

The present invention has an object to solve the problems as above and has an object to provide such a cam clutch unit that can receive the axial load in a small space without increasing the rigidity of the cage ring or disposing another member.

The present invention is a cam clutch unit which solves the aforementioned problems by constituting a cam clutch unit including a plurality of cams and a plurality of rollers disposed between an inner ring and an outer ring coaxially provided capable of relative rotation, a cage ring having a plurality of pocket portions which regulate relative movement in a circumferential direction of the cam and the roller, and an annular spring which urges the cam, in which the roller is configured to have a part protruding in an axial direction more than the cage ring when being held by the cage ring.

According to a cam clutch unit described in claim 1, since the roller protrudes in the axial direction more than the cage ring when being held by the cage ring, a member which transmits the axial load from the outer ring or the inner ring can be brought into contact with a protruding end part of the roller so that the axial load can be received by the roller, whereby the axial load can be received in a small space without increasing the rigidity of the cage ring or disposing another member.

According to a configuration described in claim 2, since the roller has a circumferential-shape groove portion and a holding beam portion extending in a circumferential direction and capable of advancing in the pocket portion of the roller, an axial position with respect to the cage ring can be regulated by the groove portion, and while the roller is stably held, a part protruding from the cage ring can be provided on the roller.

According to a configuration described in claim 3, since the roller has a small-diameter cylinder portion on the end part in the axial direction, the small-diameter portion can be caused to protrude in the axial direction more than the cage ring.

According to a configuration described in claim 4, since the pocket portion of the roller has the holding beam portion extending in the circumferential direction at a position corresponding to the small-diameter cylinder portion, regulating is enabled on the end surface of the large-diameter portion of the roller at the axial position with respect to the cage ring, whereby the roller can be stably held.

According to a configuration described in claim 5, since the cage ring is formed of a plate-shaped material made of metal, the cage ring can be made thinner and more light-weighted.

DESCRIPTION OF THE PREFERRED EMBODIMENTS

First Embodiment

Figure 1:
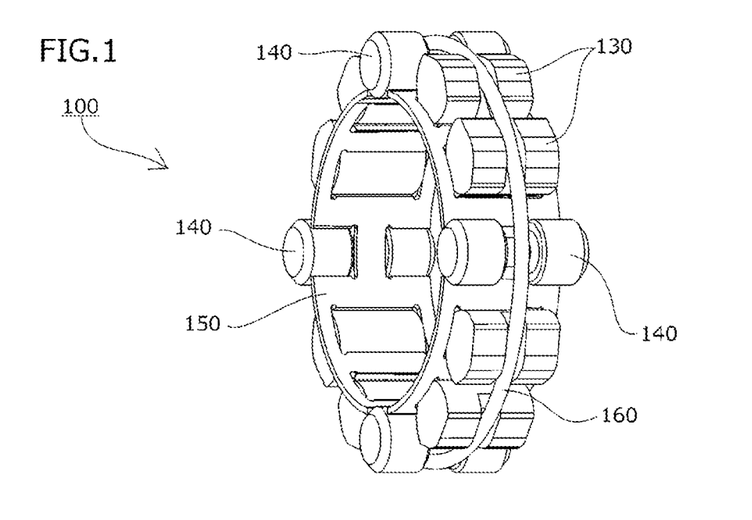
FIG. 1 is a perspective view of a cam clutch unit of a First Embodiment of the present invention.
Figure 2:
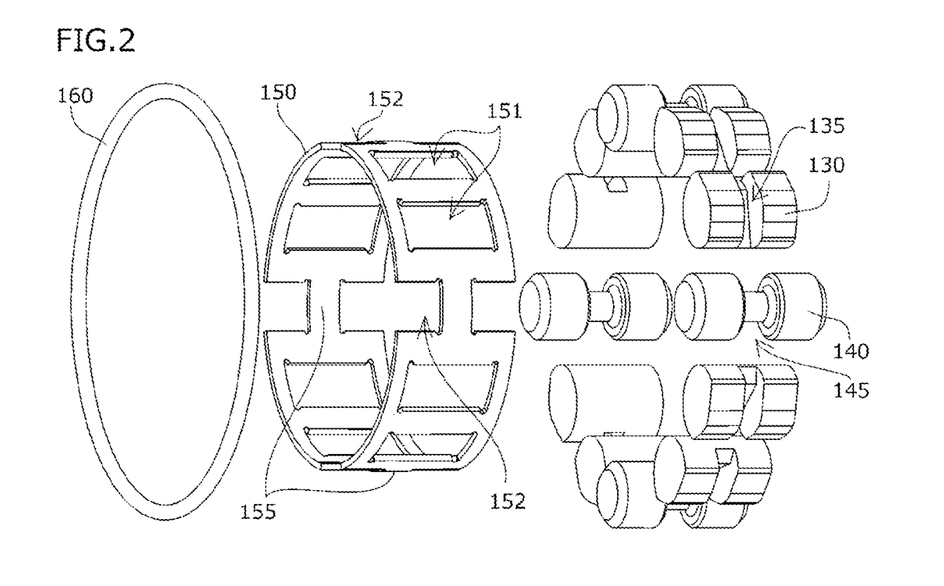
FIG. 2 is an exploded perspective view of the cam clutch unit shown in FIG. 1.
Figure 3:
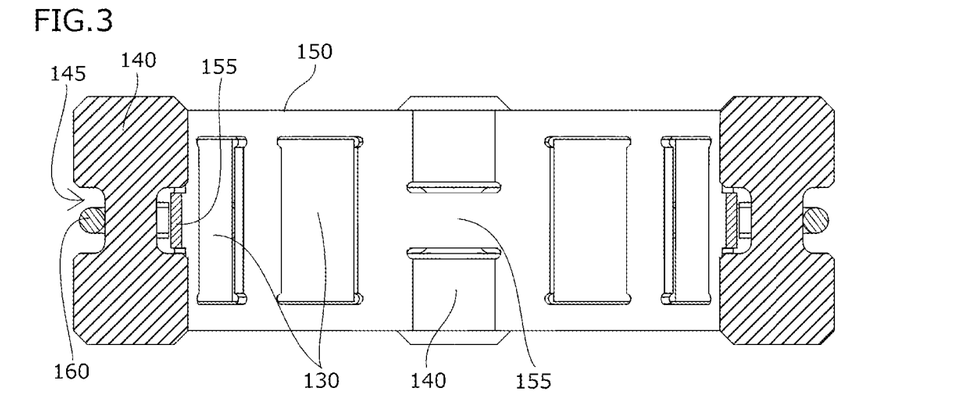
FIG. 3 is a sectional view of the cam clutch unit shown in FIG. 1.

A cam clutch unit 100 according to a First Embodiment of the present invention includes, as shown in FIGS. 1 to 3, a plurality of cams 130 as engagement elements which transmit and shut off a torque between an inner ring and an outer ring in an annular space between a track surface of the inner ring and a track surface of the outer ring coaxially provided capable of relative rotation, a plurality of rollers 140 which freely rotate the inner ring and the outer ring, a cage ring 150 having a plurality of pocket portions 151, 152 which regulate relative movement in a circumferential direction of the cam 130 and the roller 140, and an annular spring 160 which urges each of the plurality of cams 130 to a meshing direction with respect to the inner ring and the outer ring.

Each of the plurality of cams 130 has, as shown in FIGS. 1, 2, a groove portion 135, which is engageable with the annular spring 160, at a center in an axial direction.

In this Embodiment, a bottom part of the groove portion 135 has an inclined shape which is a protruding part at an eccentric position, and when the spring 160 presses the protruding part of the bottom part of the groove portion 135, the cam 130 is urged toward the inner ring side and is urged to swing in a direction in which the cam 130 is operated.

The plurality of rollers 140 have, as shown in FIGS. 1, 2 and the like, a groove portion 145 engageable with the annular spring 160 at the center in the axial direction.

In this Embodiment, an outer-peripheral edge part of the groove portion 145 of the roller 140 is chamfered, whereby hooking with the spring 160 is prevented.

The cage ring 150 has the pocket portion 151 which accommodates the cam 130 and regulates relative movement in the circumferential direction and the pocket portion 152 which accommodates the roller 140 and regulates relative movement in the circumferential direction.

The pocket portion 151 which accommodates the cam 130 is constituted by having a shape surrounded on four sides so that the movement of the cam 130 in the axial direction is regulated on both ends in the axial direction.

The pocket portion 152 which accommodates the roller 140 has a holding beam portion 155 extending in the circumferential direction and capable of advancing into the groove portion 145 of the roller 140 and is constituted by having such a shape that a center is connected by the holding beam portion 155 in the circumferential direction and both ends in the axial direction are open.

In this Embodiment, the pocket portions 151 of the cage ring 150, which accommodate the cams 130, are uniformly disposed at 8 spots and the pocket portions 152 which accommodate the rollers 140 at four spots.

In the pocket portion 151, the movement in the axial direction of the cam 130 is regulated on the both end surfaces by the pocket portion 151, and in the pocket portion 152, the movement in the axial direction of the roller 140 is regulated on the both side surfaces of the groove portion 145 by the holding beam portion 155.

Moreover, an end edge adjacent to the cam 130 in the circumferential direction of the pocket portion 151 accommodating the cam 130 is formed by having a shape which regulates the movement of the cam 130 to the inner ring side, and an end edge adjacent to the roller 140 in the circumferential direction of the pocket portion 152 accommodating the roller 140 is formed by having a shape which regulates the movement of the roller 140 to the inner ring side.

Furthermore, the spring 160 is extended between the groove portion 135 of the cam 130 and the groove portion 145 of the roller 140 and regulates the movement of the cam 130 and the roller 140 to the outer ring side and thus, the cam clutch unit 100 is constituted in a state where the movement of the cam 130 and the roller 140 in a radial direction, the circumferential direction, and the axial direction is regulated.

The roller 140 is constituted by having a shape protruding more than an open part on the both ends of the pocket portion 152 as shown in FIGS. 1, 3 and having a part protruding in the axial direction on the both sides more than the cage ring 150.

As a result, the axial load in the axial direction received from the outer ring and the inner ring can be received on the both ends of the roller 140, whereby the axial load can be received in a small space without increasing the rigidity of the cage ring 150 or disposing another member.

In this Embodiment, it is only necessary that the cage ring 150 has such rigidity of a degree capable of positional regulation and holding of the cam 130 and the roller 140 and thus, it is constituted by an annular metal thin plate in which the pocket portions 151, 152 are formed by punching or the like, are easily manufactured and is light-weighted.

It is to be noted that, in this Embodiment, the eight cams 130 and the four rollers 140 are in the same numbers and are alternately disposed, but the number and disposition of the cams 130 and the rollers 140 may be arbitrary.

Second Embodiment

Figure 4:
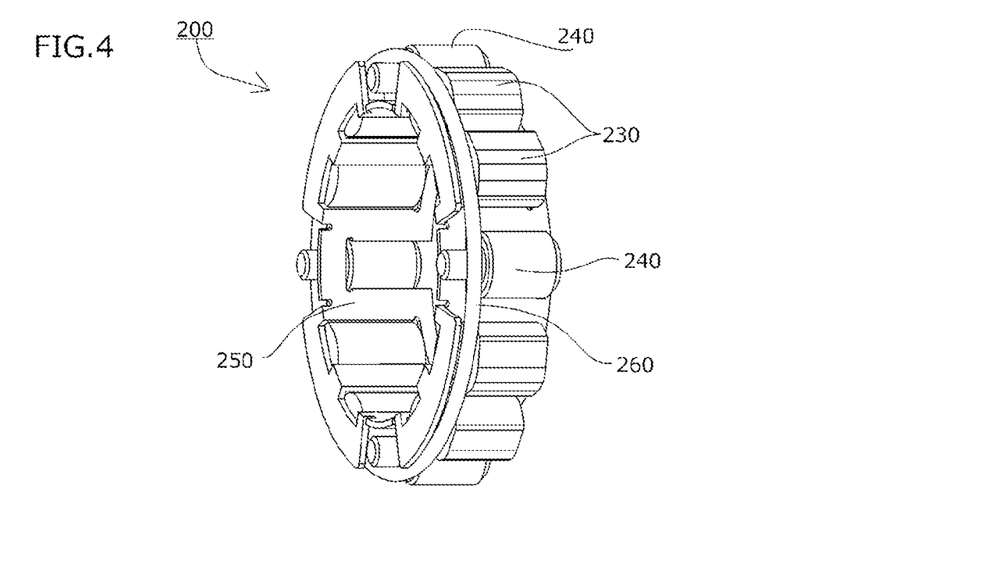
FIG. 4 is perspective view of a cam clutch unit of a Second Embodiment of the present invention.
Figure 5:
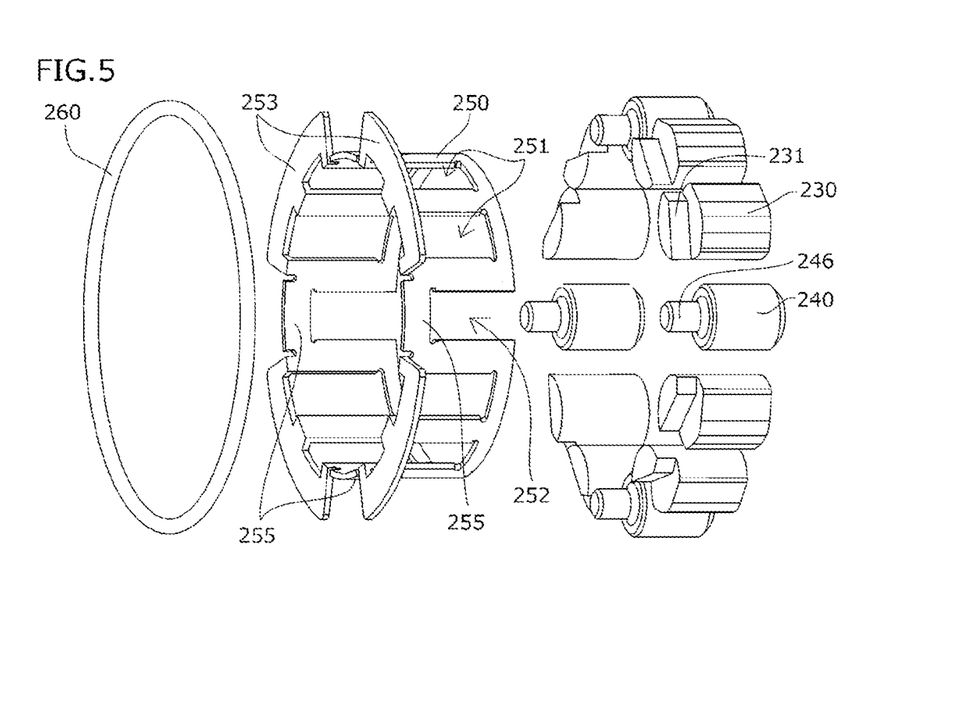
FIG. 5 an exploded perspective view of the cam clutch unit shown in FIG. 4.
Figure 6:
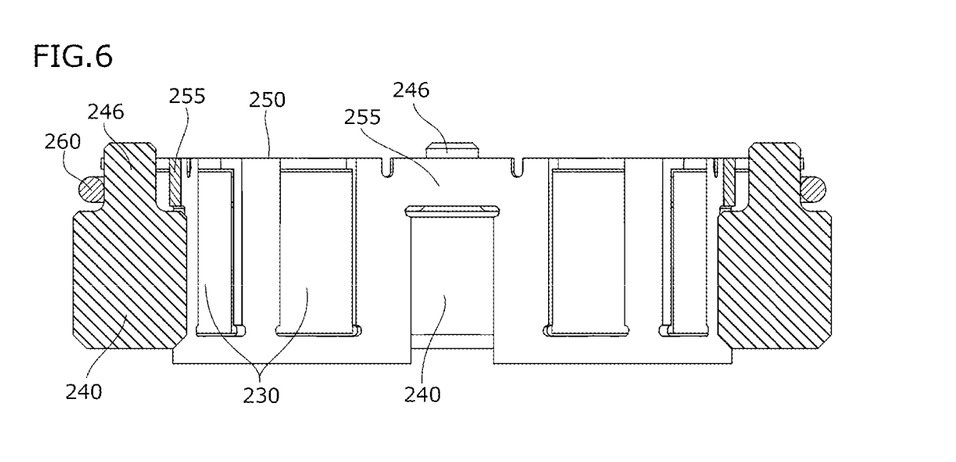
FIG. 6 is a sectional view of the cam clutch unit shown in FIG. 4.

A cam clutch unit 200 according to a Second Embodiment of the present invention includes, as shown in FIGS. 4 to 6, a plurality of cams 230 as engagement elements which transmit and shut off a torque between an inner ring and an outer ring in an annular space between a track surface of the inner ring and a track surface of the outer ring coaxially provided capable of relative rotation, a plurality of rollers 240 which freely rotate the inner ring and the outer ring, a cage ring 250 having a plurality of pocket portions 251, 252 which regulate relative movement in a circumferential direction of the cam 230 and the roller 240, and an annular spring 260 which urges each of the plurality of cams 230 to a meshing direction with respect to the inner ring and the outer ring.

Each of the plurality of cams 230 has, as shown in FIGS. 4, 5, an engagement stepped portion 231, which is engageable with the annular spring 260, on one of end surfaces in the axial direction.

In this Embodiment, the engagement stepped portion 231 has an inclined shape which is a protruding part at an eccentric position, and when the spring 260 presses the protruding part of the engagement stepped portion 231, the cam 230 is urged toward the inner ring side and is urged to swing in a direction in which the cam 230 is operated.

The plurality of rollers 240 have, as shown in FIGS. 4, 5 and the like, a small-diameter cylinder portion 246 which is engageable with the annular spring 260 on the end part in the axial direction.

In this Embodiment, an outer-peripheral edge part of a large-diameter portion on the small-diameter cylinder portion 246 side of the roller 240 is chamfered, which prevents hooking with the spring 260.

The cage ring 250 has the pocket portion 251 which accommodates the cam 230 and regulates relative movement in the circumferential direction as well as the pocket portion 252 which accommodates the roller 240 and regulates relative movement in the circumferential direction and a plurality of hook portions 253 which regulate movement in the axial direction of the annular spring 260.

The pocket portion 251 which accommodates the cam 230 is constituted by having a shape surrounded on four sides so that the movement of the cam 230 in the axial direction is regulated on both ends in the axial direction.

The pocket portion 252 which accommodates the roller 240 has a holding beam portion 255 extending in the circumferential direction at a position corresponding to the small-diameter cylinder portion 246 of the roller 240, has one of axial-direction end parts connected by the holding beam portion 255 in the circumferential direction, and is constituted having such a shape that the other axial-direction end part is open.

In this Embodiment, the pocket portions 251 of the cage ring 250, which accommodate the cams 230, are uniformly disposed at 8 spots and the pocket portions 252 which accommodate the rollers 240 at four spots.

In the pocket portion 251, the cam 230 has movement regulated by the hook portion 253 on the one end surface side in the axial direction, the movement to the other in the axial direction is regulated by the pocket portion 251, and in the pocket portion 252, the roller 240 has movement regulated by the holding beam portion 255 on the one end surface side in the axial direction.

Moreover, the end edge adjacent to the cam 230 in the circumferential direction of the pocket portion 251 accommodating the cam 230 is formed by having a shape which regulates movement of the cam 230 to the inner ring side, and the end edge adjacent to the roller 240 in the circumferential direction of the pocket portion 252 accommodating the roller 240 is formed by having a shape which regulates the movement of the roller 240 to the inner ring side.

Furthermore, the spring 260 is extended between the engagement stepped portion 231 of the cam 230 and the small-diameter cylinder portion 246 of the roller 240 and regulates the movement of the cam 230 and the roller 240 to the outer ring side and thus, the cam clutch unit 200 is constituted in a state where the movement of the cam 230 and the roller 240 in a radial direction, the circumferential direction, and the axial direction is regulated.

The roller 240 is constituted by having such a shape that, as shown in FIGS. 4, 6, a distal end of the small-diameter cylinder portion 246 protrudes beyond the holding beam portion 255 on the one end part in the axial direction and has a part protruding more than the cage ring 250 in the axial direction.

Since the cage ring 250 is disposed at a position close to the inner ring, though receiving of an axial load in the axial direction received from the inner ring on the open side of the roller 240 is difficult, the axial load in the axial direction received from the outer ring can be received on the open side of the roller 240 easily and thus, the axial load in the axial direction received from the inner ring can be received at the distal end of the small-diameter cylinder portion 246 of the roller 240 protruding in the axial direction more than the cage ring 250, whereby the axial load can be received in a small space without increasing the rigidity of the cage ring 250 or disposing another member.

In this Embodiment, since the rigidity of the cage ring 250 only needs to be such a degree that is capable of positional regulation and holding of the cam 230, the roller 240 and thus, the pocket portions 251, 252 are formed by punching or the like and constituted by an annular metal thin plate in which the hook portion 253 is formed by bending, and manufacture is easy and light-weighted.

It is to be noted that, in this Embodiment, the eight cams 230 and the four rollers 240 are in the same numbers and are alternately disposed, but the number and disposition of the cams 230 and the rollers 240 may be arbitrary.

Moreover, in this Embodiment, the movement of the roller 240 is not regulated on the open side of the pocket portion 252, but the movement in both the directions in the axial direction of the roller 240 may be regulated by forming the pocket portion 252 with a shape closed on both the sides in the axial direction and by providing the small-diameter cylinder portion 246 on both the sides in the axial direction of the roller 240.

Furthermore, the open side of the roller 240 may be extended or the small-diameter cylinder portion 246 may be provided also on the open side so as to protrude in the axial direction more than the cage ring 250 and the axial load in the axial direction received from the outer ring and the inner ring can be received on both the ends of the roller 240.

Third Embodiment

Figure 7:
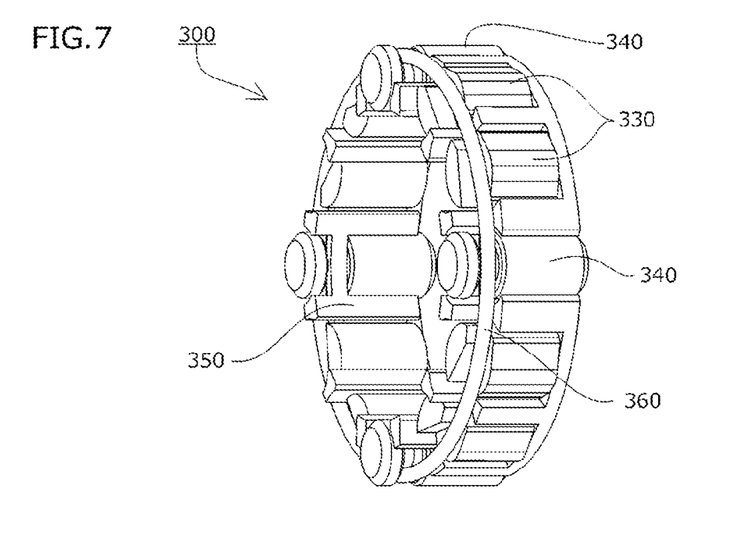
FIG. 7 is a perspective view of a cam clutch unit of a Third Embodiment of the present invention.
Figure 8:
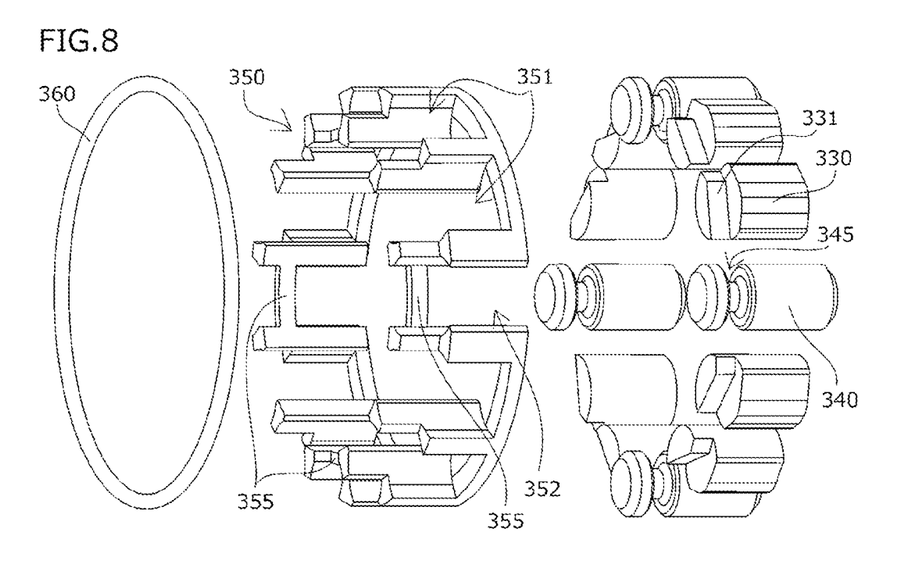
FIG. 8 an exploded perspective view of the cam clutch unit shown in FIG. 7.
Figure 9:
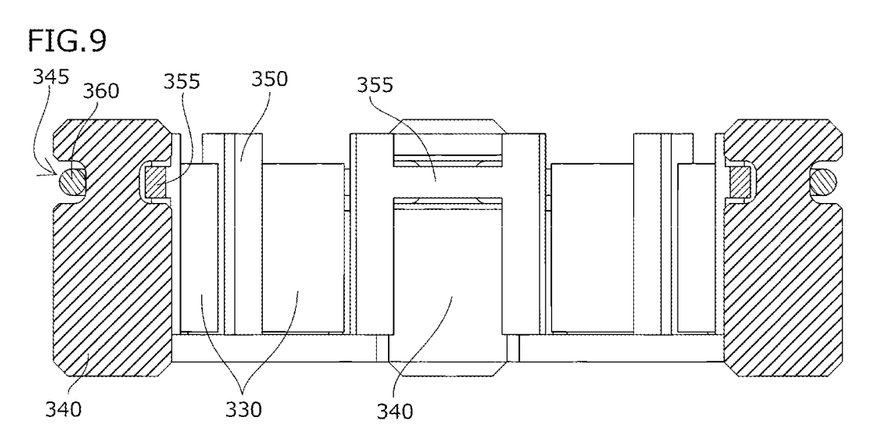
FIG. 9 is a sectional view of the cam clutch unit shown in FIG. 7.
Figure 10:
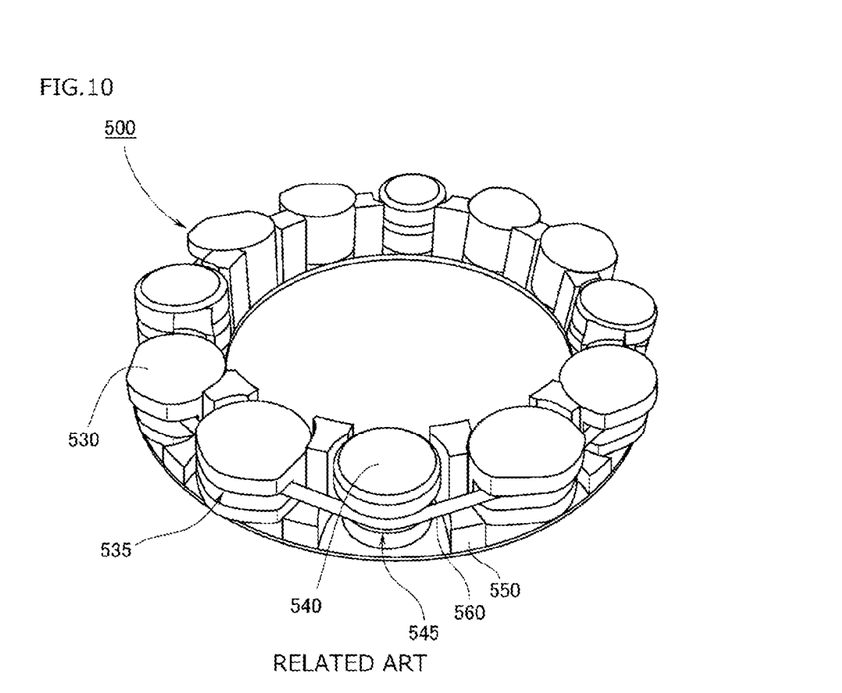
FIG. 10 is a perspective view of a conventional cam clutch unit.
Figure 11:
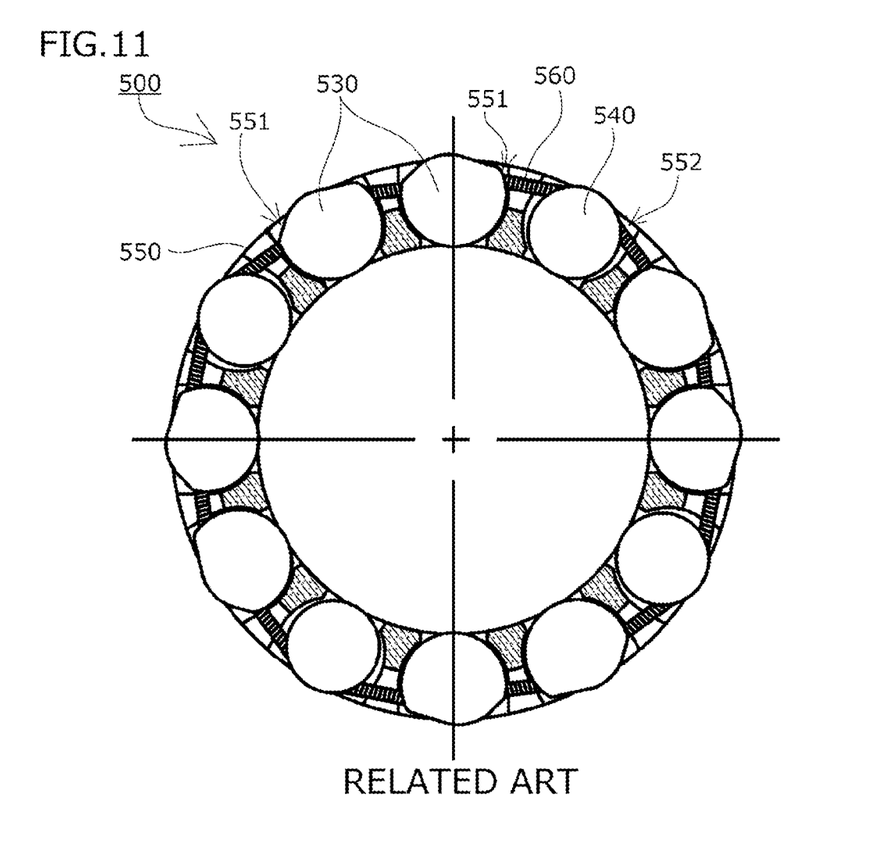
FIG. 11 is a side view of the cam clutch unit shown in FIG. 10 viewed in a rotation axis direction.

A cam clutch unit 300 according to a Third Embodiment of the present invention includes, as shown in FIGS. 7 to 9, a plurality of cams 330 as engagement elements which transmit and shut off a torque between an inner ring and an outer ring in an annular space between a track surface of the inner ring and a track surface of the outer ring coaxially provided capable of relative rotation, a plurality of rollers 340 which freely rotate the inner ring and the outer ring, a cage ring 350 having a plurality of pocket portions 351, 352 which regulate relative movement in a circumferential direction of the cam 330 and the roller 340, and an annular spring 360 which urges each of the plurality of cams 330 to a meshing direction with respect to the inner ring and the outer ring.

Each of the plurality of cams 330 has, as shown in FIGS. 7, 8, an engagement stepped portion 331, which is engageable with the annular spring 360, on one of end surfaces in the axial direction.

In this Embodiment, the engagement stepped portion 331 has an inclined shape which is a protruding part at an eccentric position, and when the spring 360 presses the protruding part of the engagement stepped portion 331, the cam 330 is urged toward the inner ring side and is urged to swing in a direction in which the cam 330 is operated.

The plurality of rollers 340 have, as shown in FIGS. 7, 8 and the like, a groove portion 345 which is engageable with the annular spring 360 close to the end part in the axial direction.

In this Embodiment, an outer-peripheral edge part on the groove portion 345 of the roller 340 is chamfered, which prevents hooking with the spring 360.

The cage ring 350 has the pocket portion 351 which accommodates the cam 330 and regulates relative movement in the circumferential direction and the pocket portion 352 which accommodates the roller 340 and regulates relative movement in the circumferential direction.

The pocket portion 351 which accommodates the cam 330 is constituted by having a shape surrounded on three sides so that the movement in the axial direction is regulated on the end surface opposite to the engagement stepped portion 331 of the cam 330.

The pocket portion 352 which accommodates the roller 340 has a holding beam portion 355 extending in the circumferential direction, capable of advancing into the groove portion 345 of the roller 340, is connected by the holding beam portion 355 in the circumferential direction, and is constituted having such a shape that the both ends in the axial direction are open.

In this Embodiment, the pocket portions 351 of the cage ring 350, which accommodate the cams 330, are uniformly disposed at 8 spots and the pocket portions 352 which accommodate the rollers 340 at four spots.

In the pocket portion 351, the cam 330 has movement regulated by the spring 360 on the one end surface side in the axial direction, the movement to the other in the axial direction is regulated by the pocket portion 351, and in the pocket portion 352, the roller 340 has movement of the both side surfaces of the groove portion 345 in the axial direction regulated by the holding beam portion 355.

Moreover, the end edge adjacent to the cam 330 in the circumferential direction of the pocket portion 351 accommodating the cam 330 is formed by having a shape which regulates movement of the cam 330 to the inner ring side, and the end edge adjacent to the roller 340 in the circumferential direction of the pocket portion 352 accommodating the roller 340 is formed by having a shape which regulates the movement of the roller 340 to the inner ring side.

Furthermore, the spring 360 is extended between the engagement stepped portion 331 of the cam 330 and the groove portion 345 of the roller 340 and regulates the movement of the cam 330 and the roller 340 to the outer ring side and thus, the cam clutch unit 300 is constituted in a state where the movement of the cam 330 and the roller 340 in the radial direction, the circumferential direction, and the axial direction is regulated.

The roller 340 is constituted by having such a shape, as shown in FIGS. 7, 9, having a part protruding beyond the open parts on the both ends of the pocket portion 352 part in the axial direction and protruding more than the cage ring 350 in the axial direction.

As a result, the axial load in the axial direction received from the outer ring and the inner ring can be received on the both ends of the roller 340, and the axial load can be received in a small space without increasing the rigidity of the cage ring 350 or disposing another member.

In this Embodiment, the cage ring 350 is formed of a resin, and the manufacture is easy and light-weighted.

It is to be noted that, in this Embodiment, the eight cams 330 and the four rollers 340 are in the same numbers and are alternately disposed, but the number and disposition of the cams 330 and the rollers 340 may be arbitrary.

As described above, the Embodiments of the present invention have been described in detail, but the present invention is not limited to the aforementioned Embodiments but are capable of various design changes without departing from the present invention described in the scope of claims.

What is claimed is:

1. A cam clutch unit comprising a plurality of cams and a plurality of rollers disposed between an inner ring and an outer ring coaxially provided capable of relative rotation, a cage ring having a plurality of pocket portions which regulate relative movement in a circumferential direction of the cams and the rollers, and an annular spring which urges the cams, wherein each of the rollers has a part protruding in an axial direction more than the cage ring when being held by the cage ring, wherein each of the rollers has a circumferential-shape groove portion; and each of the pocket portions for the rollers of the cage ring has a holding beam portion which extends in the circumferential direction and is capable of advancing into a respective groove portion.

2. The cam clutch unit according to claim 1, wherein each of the rollers has a small-diameter cylinder portion on an end part that serves as the part protruding in the axial direction.

3. The cam clutch unit according to claim 2, wherein each of the pocket portions for the rollers of the cage ring has the holding beam portion at a respective position corresponding to a respective small-diameter cylinder portion.

4. The cam clutch unit according to claim 1, wherein the cage ring is formed of a plate-shaped material made of metal.

5. The cam clutch unit according to claim 1, wherein each of the pocket portions for the rollers of the cage ring has the holding beam portion substantially at a respective center of the respective pocket portions for the rollers in the axial direction.

* * * * *